United States Patent Office 3,397,714
Patented Aug. 20, 1968

3,397,714
MECHANICAL GAS SEAL FOR FLOOR DRAIN TRAPS AND THE LIKE HAVING MEANS FOR SEALING IN THE TRAP AND AT A COVER THEREFOR
Sven Algot Joel Liljendahl, Gyllenstiernas vag 8, Kallhall, Sweden
Filed Nov. 16, 1964, Ser. No. 411,529
Claims priority, application Sweden, Nov. 19, 1963, 12,721/63
6 Claims. (Cl. 137—247.15)

ABSTRACT OF THE DISCLOSURE

This invention relates to a mechanical odour seal which is capable of preventing the outflow of gases from a discharge pipe, comprising a liquid receiving valve housing, an outlet from said housing and a diaphragm-like valve body normally closing said outlet, said valve housing consisting of a floor draining trap having an apertured strainer cover that can be automatically closed by means of a valve member disposed below the strainer cover when the level of liquid in the trap rises above a predetermined value.

---

Figure 1:
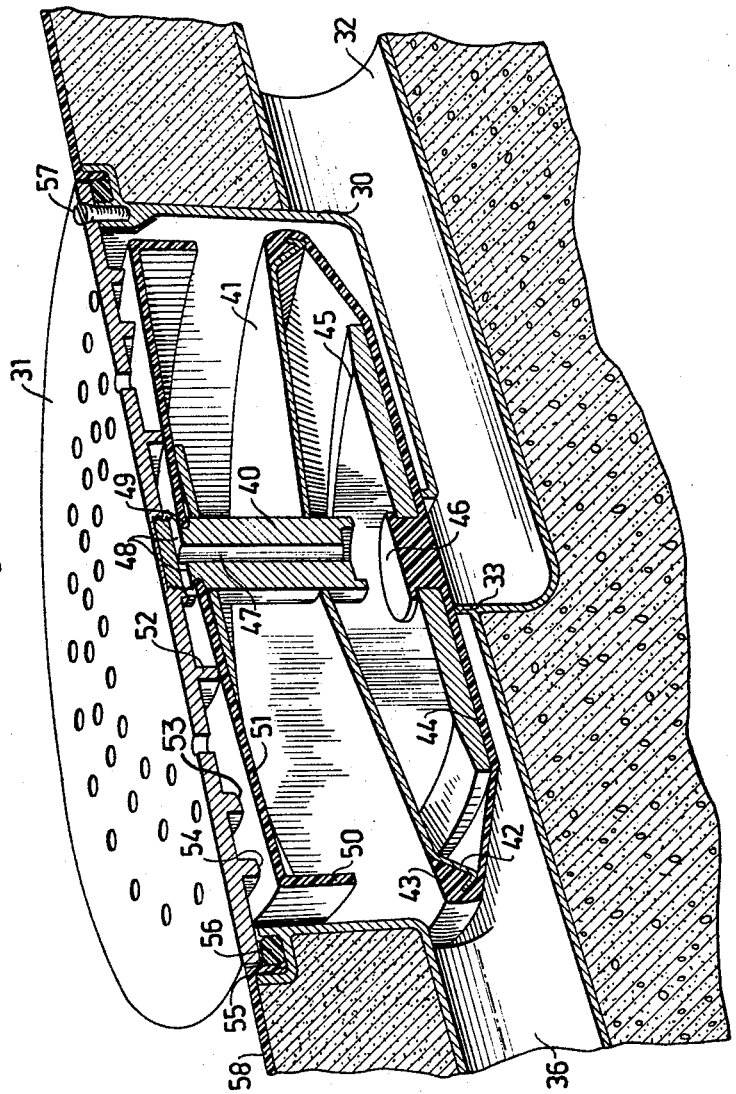

In the building construction field great advantages can be gained if both the horizontal and the vertical discharge pipes from sanitary apparatus could be selected with small dimensions, for example as flexible plastic tubes, and the horizontal portions could be installed without or with only a slight slope. As far as the water closets are concerned said problem has already been solved by connecting them to a separate pipe system which is kept under a continuous vacuum and by connecting the other sanitary apparatus to a second separate pipe system. The water discharged from sanitary apparatus other than water closets, i.e., from dish washing sinks, wash stands, bath tubs, floor draining traps and the like, is only comparatively slightly polluted and does not contain any solid or semisolid particles which are so large that they cannot readily pass through narrow pipes e.g., through pipes having an internal diameter of down to 25 mm. When dimensioning said discharge pipes, and particularly the vertical collecting or trunk pipes, consideration must be paid, however, also to the transport capacity required in each particular case. Calculations have shown that even in houses having a large number of stories the internal diameter of the vertical trunk pipes may be chosen as low as 50 mm., meaning that the trunk pipes can be made very much narrower than in conventional sewage systems.

However, in such narrow pipes great differences in pressure occur in different parts of the pipe system, particularly pressure differences originating from the vertical trunk pipes. The pressure may alternate between a super-pressure and a sub-pressure with respect to the atmospheric pressure, and the pressure differences in both directions may considerably exceed that pressure difference with respect to the atmospheric pressure which can be handled by a conventional water seal, i.e., a pressure difference corresponding to at the most ±60 to 70 mm. water column, so that a conventional seal does not under all conditions function to prevent ill-smelling gases from the sewage pipes from flowing into the room.

It is an object of the present invention to provide a mechanical odour seal or valve which is capable, either alone or in combination with a conventional water seal, of effectively preventing the outflow of gases from the sewage of discharge pipes through the sanitary apparatus even when high super-pressures are set up in the pipe systems.

With this and other objects in view there has been provided according to the invention a valve comprising a valve housing receiving water from the sanitary apparatus, a discharge pipe leading from said valve housing, and a valve body in the form of a diaphragm adapted normally to close the inner mouth of said discharge pipe under the action of a weight or the like and being adjusted to be lifted from its seat under the action of the static liquid pressure set up on its underside when, in connection with the supply of liquid to the valve housing, the static pressure exceeds a predetermined value.

The valve housing which receives water from the sanitary apparatus should be open, consisting for example of a floor draining well or trap or of a road draining gutter.

Figure 2:
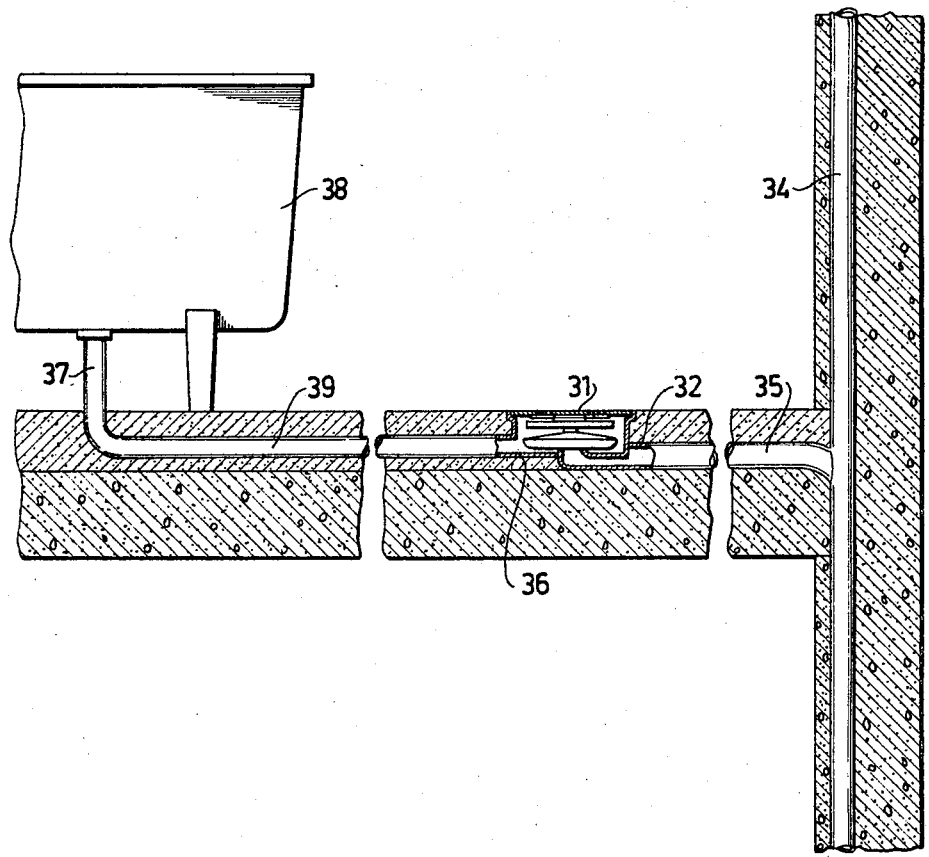

The invention will now be described more in detail with reference to the accompanying drawings, in which:

FIGS. 1 and 2 show the invention applied in a floor draining well or trap.

FIGURE 1 shows a floor drain trap equipped with an odour seal according to the invention. The drain trap proper consists as usual of a circular bowl 30 which is closed by means of a detachable strainer lid 31. Centrally in the bottom of the bowl 30 is an opening through which an outlet pipe 32 having an end portion bent at right angles projects a short distance into the bowl where the end of the pipe forms an annular valve seat 33. The branch of the outlet pipe 32 which is parallel with the bottom of the drain bowl may be connected to a narrow vertical discharge trunk pipe 34, see FIG. 2, through a comparatively thick plastic tube 35 installed in the floor with a certain slope. Opening into the floor drain from one side thereof is an inlet pipe 36. Said pipe may, in the manner shown in FIG. 4, be connected through a narrow plastic tube 39 laid in the floor without any slope to a vertical outlet pipe 37 leading from a bath tub 38 placed on the floor.

Depending from the underside of the strainer lid 31 is a pin 40 which is screwed into the lid at its upper end and carries at its lower end a circular metal plate 41 in the shape of an inverted shallow cup. The plate 41 is shaped at its circumference with a groove 42. Airtightly engaging in said groove is a correspondingly shaped edge bead 43 on a rubber diaphragm 44. Resting on the upper side of said diaphragm is a weight in the shape of a plate 45 formed with a central hole into which enters a stud 46 formed on the upper side of the diaphragm, said stud being formed with an end flange so that the diaphragm is always kept pressed against the plane underside of the plate 45. Through a central passage 47 in the carrying pin 40, which passage communicates at its upper end with two narrow transverse passages 48, communication is always established between the external air and the space between the tight-fitting carrier plate 41 and the rubber diaphragm 44, so that atmospheric pressure is upheld in said space. Immediately below the strainer plate 31 the carrier pin 40 is shaped with an annular slot 49 for holding a circular rubber plate 51, which is provided with a downwardly directed edge bead 50, in position on the pin. For co-operation with the rubber plate 51 there are provided on the underside of the strainer plate 31 three concentric annular flanges 52, 53 and 54. Under the action of its own weight the rubber plate 51 normally takes up the position shown on the drawing out of contact with the annular flanges, so that water can flow freely through the strainer plate 31 and further into the drain cup or trap. The innermost annular flange 52 is so dimensioned that in the said normal position of the rubber plate only a very narrow air gap exists between the plate and the flange, the flange thus effectively preventing water entering through the strainer plate from flowing onto the mouths of the narrow air channels 48.

At its edge the strainer plate 31 is sealingly connected to the floor trap bowl 30 by means of a packing ring 56 placed in an edge groove 55 in the bowl and compressed on the tightening of the fixing screws 57 for the strainer plate. In the embodiment shown the packing ring 56 simultaneously serves to sealingly clamp to the drain bowl the downfolded edge of a carpet 58 of plastic or the like which covers the floor in the locality in which the floor drain trap is installed.

The rubber diaphragm 44 is normally pressed against the seat 33 under the action of the weight 45, as shown in FIG. 1, then interrupting the connection between the bowl 30 and the outlet pipe 32. The free surface of water in the bowl stands at the same time at so high a level that the static up-pressure on the diaphragm is considerably lower than the downwardly directed forces acting on the diaphragm. Said normal level of the water in the floor drain can be assumed to lie approximately in level with the edge of the carrier plate 41, as indicated on the drawing. If now water flows down into the floor trap through the strainer cover 31, the level of the water in the trap will rise and consequently the up-pressure on the diaphragm will increase. Before the water reaches the lower edge of the rubber flange 50 the diaphragm 44 is lifted from its seat 33 and water can now flow out through the pipe 32. In the event of a sufficiently high inflow of water through the strainer, the water level will rise to such a height that the diaphragm will be lifted until the end of the rubber stud 46 contacts the end of the depending pin 40 and closes the air channels 47 and 48 through the pin. If then the inflow of water through the strainer should exceed the simultaneous outflow through the pipe 32, the free water surface in the floor trap will rise still more and will gradually reach the lower edge of the flange 50. If the water level should rise still more the air entrapped below the rubber plate 51 will be compressed, lifting the plate to engage the flanges 52, 53 and 54, the inflow of water being then interrupted.

It should be noted that the rubber plate first engages the innermost flange 52, so that the annular space around the carrier pin 40 is closed at an early stage, whereby water is prevented from flowing onto the mouths of the air channels 48 and further through channel 47 to the space above the diaphragm 44. When the free water surface falls again the rubber plate 51 will follow, whereafter the inflow of water to the floor trap starts again. As a rule, the discharge pipe 32 is dimensioned big enough and mounted with a sufficient slope to secure that at least under normal conditions the outflow of water corresponds to the inflow, so that the rubber disc does not prevent an uninterrupted flow through the strainer 31. If instead the water is supplied into the floor trap through pipe 36 in connection with the emptying of the bath tub the water level in the floor trap will rise very rapidly, thereby causing the openings in the strainer plate 11 to be closed. Hereafter the floor well will form a hermetically sealed space or valve housing in which a static pressure is built up which corresponds to the height above the floor trap of the free water level in the bath tub. Under the action of said initially rather high pressure the water is forced from the floor trap out through the discharge pipe 32, so that the velocity of flow through said pipe becomes high in spite of the fact that the conduit is narrow and has a very small slope. At the same time a very good self-cleansing of the discharge pipe is attained.

In the embodiment according to FIG. 1 the air channels 47, 48 may be eliminated and an axially extending air channel be taken up instead through the rubber diaphragm 44 and stud 48. The functioning of said modification is obvious. The modification in question naturally cannot be used in cases when the drain pipe system is kept under vacuum.

I claim:
1. A valve serving as a mechanical odour seal for use in a discharge pipe from a bath tube, a wash stand or similar sanitary apparatus comprising a liquid receiving valve housing, an outlet from said housing and a valve body normally closing said outlet, characterized in that the valve body consists of a diaphragm which normally is pressed against a valve seat under the action of a weight or the like and is capable of being lifted from its seat, and in that the underside of the diaphragm externally of the valve seat is in communication with a discharge from the sanitary apparatus so that the diaphragm is lifted from its seat as soon as liquid is supplied to the valve housing, said valve housing being open and consisting of a floor draining trap having a close-fitting strainer cover, the apertures of which are adapted to be automatically closed by means of a valve member disposed below the strainer cover when the level of liquid in the trap rises above a predetermined value, said valve member preferably consisting of an inverted cup of rubber or the like.

2. A valve according to claim 1, characterized in that the diaphragm is secured to a cup-shaped carrier plate suspended from the strainer cover, said cup-shaped carrier plate forming together with the diaphragm an air-filled space which preferably is in communication with the atmosphere.

3. A valve according to claim 2, characterized in that the cup-shaped carrier plate is suspended by a pin which is secured in the strainer cover and in which pin there is provided a passage connecting the space between the diaphragm and the cup-shaped carrier plate with the space between the valve member and the strainer plate.

4. A valve according to claim 3, characterized in that the strainer plate is provided in the region radially inwardly of the strainer apertures with an annular flange which, when the valve body takes up its open position, reaches almost onto the valve member, so that the air gap between the valve member and the flange will be closed at an early stage when the level of liquid in the floor trap rises.

5. A valve according to claim 4, characterized in that the strainer plate is provided on its underside in the region radially outwardly of the strainer apertures with a flange serving as a valve seat, between which flange and the valve member there is normally a rather wide gap which will be closed only when the free surface of liquid in the floor trap has risen to a considerable level.

6. A valve according to claim 5 characterized in that the diaphragm is formed on its upper side with a portion adapted to serve as a valve body, said portion engaging the lower end of the carrier pin so as to close the lower mouth of the air passage in the pin when the diaphragm is lifted from its seat to its fully open position.

References Cited
UNITED STATES PATENTS

| | | | |
|---|---|---|---|
| 2,199,675 | 5/1940 | Ronning | 137—247.15 X |
| 2,803,423 | 8/1957 | Erling | 137—624.14 |
| 1,593,083 | 7/1926 | Kirchnan | 137—247.17 |
| 1,991,100 | 2/1935 | Kelso | 251—45 X |
| 2,556,596 | 6/1951 | Perkins et al. | 137—525 X |
| 2,770,315 | 11/1956 | Powell | 137—247.35 X |
| 2,917,070 | 12/1959 | Langdon | 137—247.15 |
| 3,190,284 | 6/1965 | Koepf | 137—513.5 X |

WILLIAM F. O'DEA, *Primary Examiner.*

D. H. LAMBERT, *Assistant Examiner.*